United States Patent [19]
Haynes

[11] Patent Number: 5,434,555
[45] Date of Patent: Jul. 18, 1995

[54] THERMAL DISPERSION SWITCH WITH SELF TEST CIRCUIT

[75] Inventor: Kevin M. Haynes, Northlake, Ill.

[73] Assignee: Magnetrol International, Inc., Downers Grove, Ill.

[21] Appl. No.: 61,682

[22] Filed: May 17, 1993

[51] Int. Cl.6 ............................................. G08B 29/00
[52] U.S. Cl. ................................... 340/515; 340/604; 340/622
[58] Field of Search .................. 340/515, 622, 604; 324/713, 704; G08B 29/00

[56] References Cited

U.S. PATENT DOCUMENTS

| | | | |
|---|---|---|---|
| 2,924,972 | 2/1960 | Biermann | 379/204.21 |
| 3,068,693 | 12/1962 | Ferran et al. | 73/204.19 |
| 3,781,858 | 12/1973 | Lewis | 340/515 |
| 3,955,416 | 5/1976 | Waiwood | 340/622 |
| 3,967,281 | 6/1976 | Dageford | 340/516 |
| 4,053,874 | 10/1977 | Glaser | 340/515 |
| 4,321,590 | 3/1982 | Ishikawa et al. | 340/515 |
| 4,326,199 | 4/1982 | Tarpley et al. | 340/622 |
| 4,417,231 | 11/1983 | Watt | 340/515 |
| 4,500,761 | 2/1985 | Kobuta et al. | 340/515 |
| 4,564,834 | 1/1986 | Steele | 340/622 |
| 4,656,464 | 4/1987 | Cliffgard | 340/622 |
| 4,660,026 | 4/1987 | Chandler | 340/605 |
| 4,901,061 | 2/1990 | Twerdochlib | 340/604 |
| 4,922,226 | 5/1990 | Hsieh et al. | 340/622 |
| 4,967,593 | 11/1990 | McQueen | 340/622 |
| 5,031,126 | 7/1991 | McCulloch et al. | 340/622 |

FOREIGN PATENT DOCUMENTS 1428588  3/1976  United Kingdom ................ 340/515

Primary Examiner—Scott A. Rogers
Assistant Examiner—Thomas L. Stoll
Attorney, Agent, or Firm—Wood, Phillips, VanSanten, Clark & Mortimer

[57] ABSTRACT

A thermal dispersion flow/level switch includes a dual element probe assembly. Each element comprises an RTD sensor. The two RTD's are driven at different currents at a fixed ratio so that one RTD is self heated to establish a temperature differential. When a process product comes in contact with the heated sensor, the thermal differential is diminished. The differential is set to determine presence or absence of a process media and provide a change of contact state responsive thereto. In a flow application under no flow or low flow conditions, the RTDs will stabilize with a sufficient temperature differential which decreases in response to higher flow rates.

20 Claims, 6 Drawing Sheets

THERMAL DISPERSION SWITCH WITH SELF TEST CIRCUIT

FIELD OF THE INVENTION

The present invention relates to a thermal dispersion switch and, more particularly, to a thermal dispersion switch including a self test circuit.

BACKGROUND OF THE INVENTION

A thermal dispersion switch can be used for sensing either flow or level. A sensor includes two probes disposed in a process media. The operation is based on the dispersion of thermal energy by the process media as it flows past the probes, or comes into contact with the probes. Air and other gases generally have less heat absorbing capacity than liquids. When the media is flowing the process acts to move the material away from the sensor probes so that the thermal absorbing capacity is greater under flow conditions. In stagnant, i.e., no flow, conditions, the sensor probes cause the media around them to stabilize at some temperature higher than the typical process temperature. A thermal dispersion switch uses these factors to test for either the presence of air/gas or liquid with a level switch, or the rate of flow being above or below a specifically set flow rate.

In one known form, the thermal dispersion switch includes a sensor having two probes each containing a resistance temperature device (RTD). The resistance of the RTD varies with temperature. The first RTD is internally heated to establish a temperature above the process temperature. The second RTD is unheated and provides reference temperature of the process so that the measurement can be compensated for the process temperature. The first RTD senses the changes in thermal dissipation of the flow and/or liquid level. A sensing circuit responds to this information to provide an output generally in the form of a relay contact closure.

Advantageously, a process instrument should be periodically tested to verify proper operation of the instrument circuitry. Performance of such tests required that the instrument be removed from its application. This usually entailed disconnecting electrical terminations and conduit and other appurtenances. Not only was such a procedure time consuming, it might also require process downtime.

An additional problem results during start-up of a thermal dispersion switch, as time is required for the first probe to be heated to a sufficient level for proper operation. Prior to heating of the probe, the instrument would sense a high flow or level condition, thus actuating an alarm or other control circuits.

The present invention is directed to overcome one or more of the problems discussed above in a novel and simple manner.

SUMMARY OF THE INVENTION

In accordance with the invention there is disclosed a thermal dispersion switch including a self test circuit which controls current to two probe RTD's to simulate a change in thermal properties of a process media.

Broadly, there is disclosed herein a thermal dispersion sensing instrument for detecting thermal properties of a process media. A sensor includes two probes, each enclosing a resistance temperature device (RTD), the probes being adapted to be disposed in a process media. A power circuit includes first and second current sources, each connected to one of the RTD's. The first and second current sources produce current to the RTD's at a fixed ratio to cause self heating of one of the probe RTDs relative to the other. A sensing circuit is connected to the first and second RTDs including a comparator for comparing voltage across the first RTD and the second RTD to determine thermal properties of the process media. A self test circuit is operatively associated with the power circuit, including means for selectively modifying the fixed current ratio of RTD current to simulate a change in thermal properties of the process media. An output circuit includes means operatively driven by the comparator for indicating the determined thermal properties.

It is a feature of the invention that the self test circuit comprises a switch connected in shunt with the self heated RTD and including means for selectively operating the switch to simulate a change in thermal properties of the process media.

It is a further feature of the invention that the switch comprises a Reed switch operated by positioning a magnet in proximity thereto.

It is another feature of the invention that the self test circuit comprises a switch and series resistor connected in shunt with the self heated RTD and including means for selectively operating; the switch to simulate a select change in thermal properties and process media.

It is yet another feature of the invention that the self test circuit comprises a switch connected to the current source operatively associated with the self heated RTD and including means for selectively operating the switch to produce a drop in current to the self heated RTD to cause a corresponding drop in voltage across the self heated RTD.

It is yet a further feature of the invention that the switch comprises a relay and the operating means comprises a push button.

It is a further feature of the invention that the switch comprises a relay and the operating means comprises a terminal connected to the relay to provide remote operation of the self test circuit.

It is still another feature of the invention that the output circuit includes a delay circuit to prevent operation of the indicating means a select time duration after first operation of the power circuit.

It is still another feature of the invention that the delay circuit includes means for selecting a relatively short select time duration and a relatively long select time duration.

It is still yet a further feature of the invention that the self test circuit comprises a switch for selectively reversing the RTD's to the first and second current sources.

More particularly, a thermal dispersion flow/level switch includes a dual element probe assembly. Each element comprises an RTD sensor. The two RTD's are driven at different currents at a fixed ratio so that one RTD is self heated to establish a temperature differential. When a process product comes in contact with the heated sensor, the thermal differential is diminished. The differential is set to determine presence or absence of a process media and provide a change of contact state responsive thereto. In a flow application under no flow or low flow conditions, the RTDs will stabilize with a sufficient temperature differential which decreases in response to higher flow rates.

A self test feature according to the invention uses a manually operated switch which controls current to decrease the current differential. A power on delay uses a time delay after turn-on before a relay output is enabled.

Further features and advantages of the invention will be readily apparent from the specification and from the drawing.

DETAILED DESCRIPTION OF THE INVENTION

Figure 1:
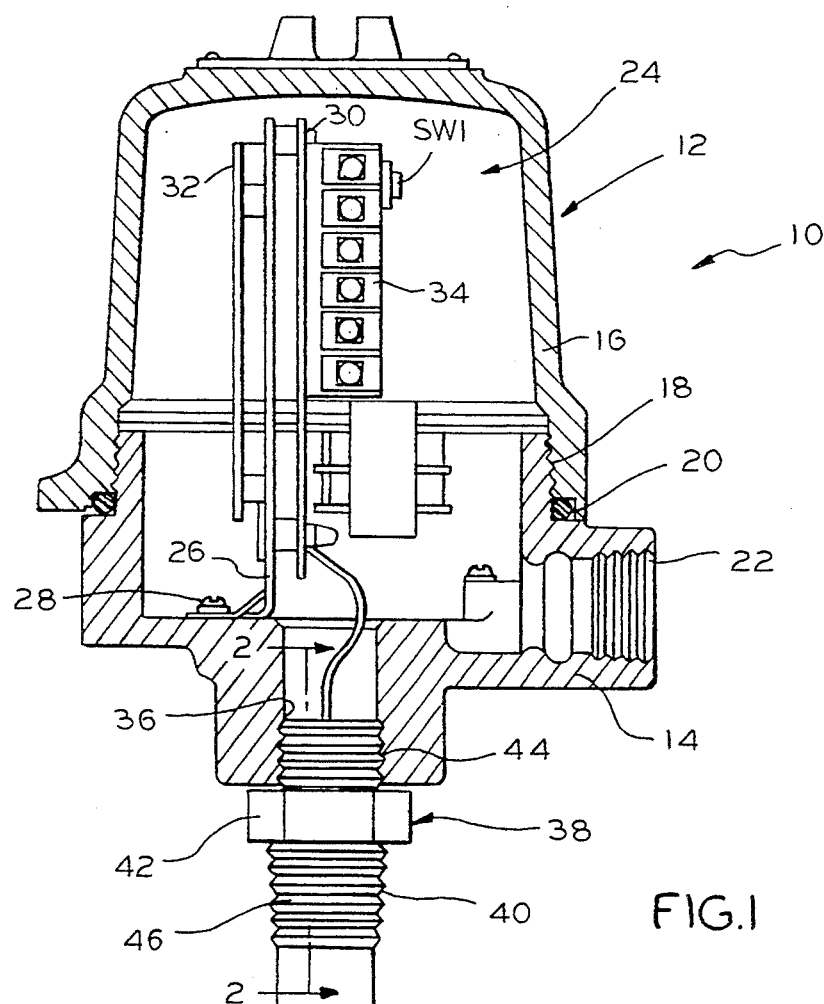
FIG. 1 is a partial sectional elevation view of a thermal dispersion switch according to the invention.

Referring first to FIG. 1, a sensing instrument in the form of a thermal dispersion switch 10 is illustrated. The switch 10 is adapted for use either as a liquid level switch providing a contact change of state upon a process media reaching a select level; or as a flow switch used to provide a contact change of state upon flow rate of a process media exceeding a select flow rate.

The switch 10 includes a housing 12 having a base 14 and a cover 16. The base 14 and the cover 16 are threadably connected as at 18 with an O-ring seal 20 therebetween. A threaded opening 22 is included on the base 14 for connecting to a conduit (not shown) for carrying electrical conductors to be connected to external circuits.

The opening 22 opens into an internal space 24. A bracket 26 mounted to the base 14 using a fastener 28 mounts first and second circuit boards 30 and 32 including various circuits described below. The first circuit board 30 includes a terminal block 34 for connection of the electrical conductors discussed above.

The base 14 includes a second threaded opening 36. Threadably received in the opening 36 is a sensor in the form of a probe assembly 38. The sensor 38 includes a coupler 40 including an adaptor nut 42 separating first and second threaded portions 44 and 46. The first threaded portion 44 is threadably received in the base opening 36. The second threaded portion 46 is adapted to be received in a suitable threaded opening in a process vessel or conduit, or the like. An extension tube 48 is connected between the coupler 40 and a sensor tip 50. The length of the extension tube 48 is selected according to the desired spacing between the sensor tip 50 and coupler 40. The sensor tip 50 includes a first probe 52 and a second probe 54. Each of the probes 52 and 54 includes an internal resistance temperature device (RTD) 56 and 58, respectively.

Figure 2:
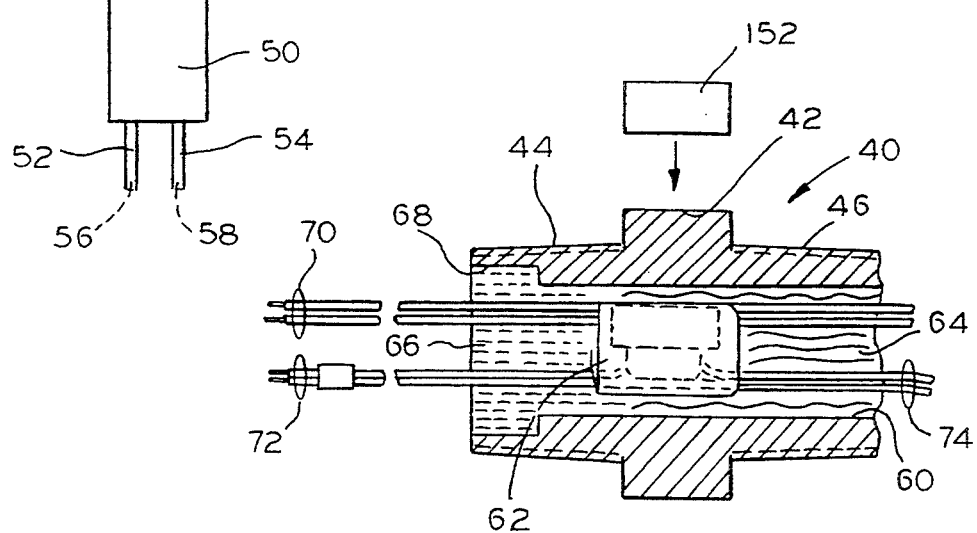
FIG. 2 is a sectional view taken along the line 2—2 of FIG. 1.

With reference to FIG. 2, the coupler 40 is illustrated in greater detail. The coupler 40 includes a central bore 60 housing a Reed relay 62. The Reed relay 62 is surrounded by tissue paper 64 to maintain a desired position of the Reed relay 62 within the bore 60. A potting compound 66 seals an open end 68 at the first threaded portion 44. A first set of conductors 70 extends through the coupler 40 to the second RTD 58. A second set of conductors 72 are connected to the Reed relay 62 with a third set of conductors 74 continuing from the Reed relay 62 to the first RTD 56.

FIGS. 3, 4, 5A and 5B schematically illustrate circuits contained on the two circuit boards 30 and 32. The first circuit board 30 includes a power supply circuit 100 illustrated in FIG. 3 and an output circuit 102 illustrated in FIG. 4. The second circuit board 32 includes a control circuit 104 illustrated in FIGS. 5A and 5B.

Figure 3:
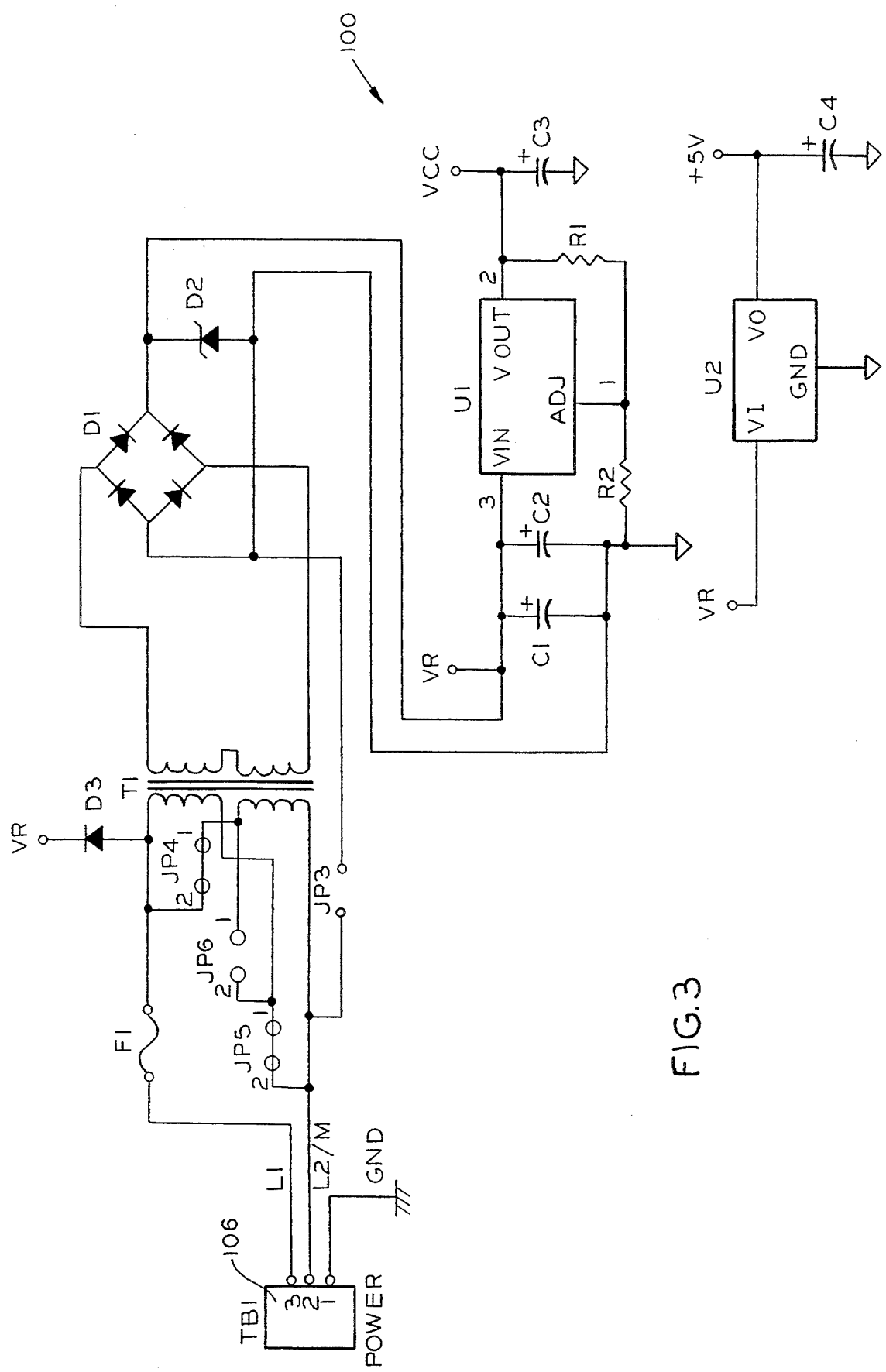
FIG. 3 is a schematic diagram of a power supply circuit of the switch of FIG. 1.

With initial reference to FIG. 3, the power supply circuit 100 is now described.

The power supply circuit 100 includes a terminal block 106 for connecting to a power source. The terminal block 106 may connect to either a 120 or 240 volt AC power source or to a 24 volt DC power source. The terminal block TB1 is connected through a fuse F1 to the primary of a transformer T1. The secondary of the transformer T1 is connected to a full wave bridge rectifier D1. For 120 volt DC operation a pair of jumpers JP4 and JP5 are used, as shown. For 240 volt AC operation a jumper JP6 is used. For 24 volt DC operation, a jumper JP3 is used. The jumper JP3 is connected directly to the output side of the bridge rectifier D1.

The output of the bridge rectifier D1 comprises a 24 volt DC supply at a node VR. This supply is also provided to the input of a voltage regulator circuit U1, such as an LM317L integrated. circuit, to develop regulated output voltage VCC at +20 volts. The VR node is also connected to a second voltage regulator circuit U2, such as an LM78L05 integrated circuit, to develop regulated DC power at +5 volts.

Figure 4:
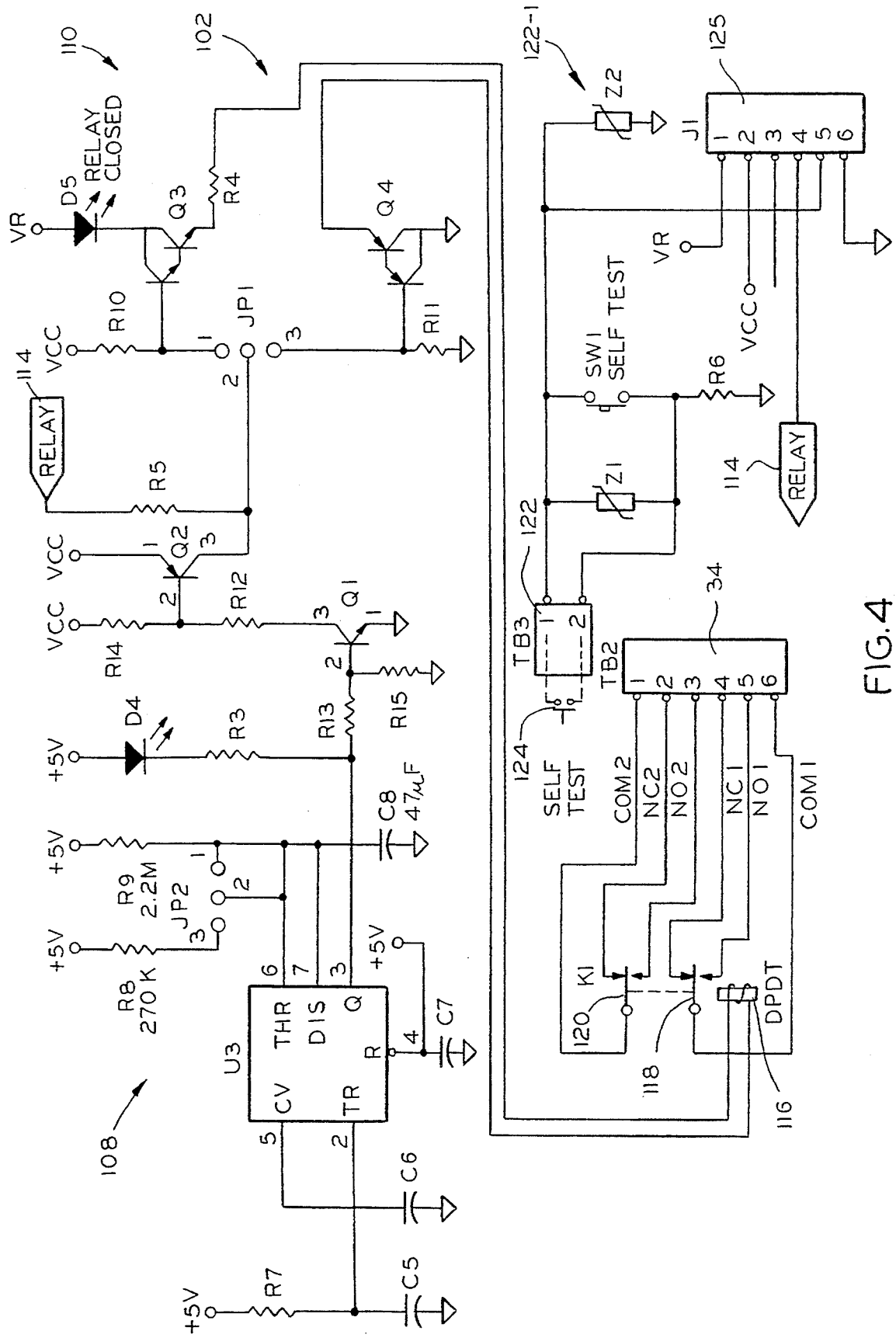
FIG. 4 is a schematic diagram of an output circuit of the switch of FIG. 1.

With reference to FIG. 4, the output circuit 102 is illustrated schematically. The output circuit 102 includes a power on delay circuit 108 and a relay drive circuit 110 for controlling operation of an output relay K1. Also included is a self test input circuit 112-1.

The power on delay circuit includes a one shot U3, such as a type LM7555 integrated circuit, having its trigger input connected to the +5 volt regulated supply. The one shot develops a pulse at its output Q when the trigger input goes high. The time duration of the pulse is determined by an RC circuit including a capacitor C8 and either a resistor R8 or a resistor R9. A jumper JP2 selects the duration by connecting either the resistor R8 or the resistor R9 to the timing input of the one shot U3. Particularly, if jumper terminals 1 and 2 are shorted, then a two minute time duration is provided, while if the jumper terminals 2 and 3 are shorted together, then a twelve second time duration results. The twelve second time duration is used for level applications where the probe assembly is sensing a generally static condition. The two minute delay is used in flow applications as flow past the probe assembly 38 requires a longer stabilization time.

The output of the one shot U3 is connected through a resistor R13 to the base of a transistor Q1. The output is also connected through a resistor R3 to an LED D4. The collector of the transistor Q1 is connected via resistor R12 to the base of a transistor Q2 and through another resistor R14 to VCC. The emitter of the transistor Q2 is connected to terminal 2 of a jumper JP 1. A relay control node 114 from the control circuit 104, discussed below, is also connected through a resistor R5 to the emitter of the transistor Q2.

When power is first mined on, the output of the one shot U3 is pulsed for a select duration according to position of the jumper JP2 to turn on the transistors Q1 and Q2 to provide 20 volts at the jumper JP1 to override relay control from the control circuit 104. During the power on delay, the LED D4 is off. After the pulse terminates, the LED D4 is turned on and the transistors Q1 and Q2 are turned off. Thereafter, the voltage at the jumper JP1 is controlled by voltage at the node 114.

The jumper JP1 selects the fail safe operating mode, namely, whether the relay K1 is on for high flow/level or low flow/level. If the jumper JP1 is selected with terminals 2 and 3 shorted, then the relay K1 will trip on for increasing flow or level. If the terminals 1 and 2 of the jumper JP1 are shorted, then the relay K1 is on for low flow or liquid level.

Terminal 1 of the jumper JP 1 is connected to the base of a transistor Q3 which is connected between the unregulated supply VR and an LED D5 to one side of a coil 116 of the relay K1. The terminal 3 of the jumper JP1 is connected to the base of a transistor Q4 connected between ground and the opposite side of the coil 116. The coil 116 drives first and second relay contacts 118 and 120 connected to the terminal block 34, see also FIG. 1. The LED D5 is energized when the relay coil 116 is energized.

The self test circuit 112-1 includes a terminal block 122 for remote connection, as illustrated in dash lines, to a switch 124 and in parallel with a self test push button switch SW1. The push button switch SW1 is mounted to the first circuit board 30, see FIG. 1. The switch SW1 can be depressed to initiate a self test operation, as described below. Alternatively, the remote switch 124 can be actuated to initiate a self test operation. Both the terminal block 122 and the push button SW1 are connected to terminal 5 of a jumper block 125 connected via a ribbon cable (not shown) to a corresponding jumper block 126 for the control circuit 104 on the second circuit board 32, see FIGS. 5A and 5B. Self test operation is initiated when terminal 5 of the block 125 is shorted to ground by either the remote switch 124 or the push button switch SW1.

Figure 5A:
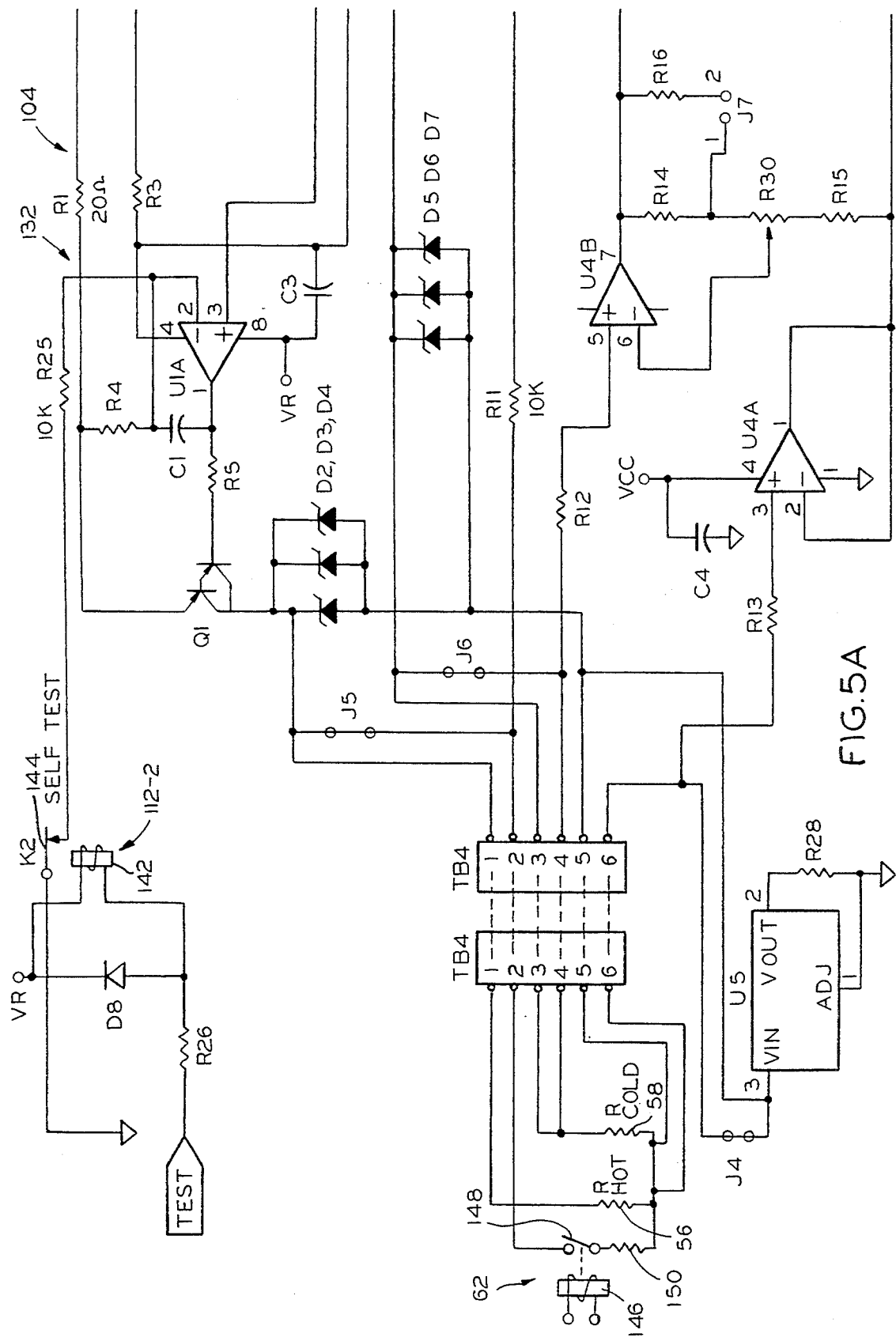
FIGS. 5A and 5B comprise a schematic diagram of a control circuit for the switch of FIG. 1.
Figure 5B:
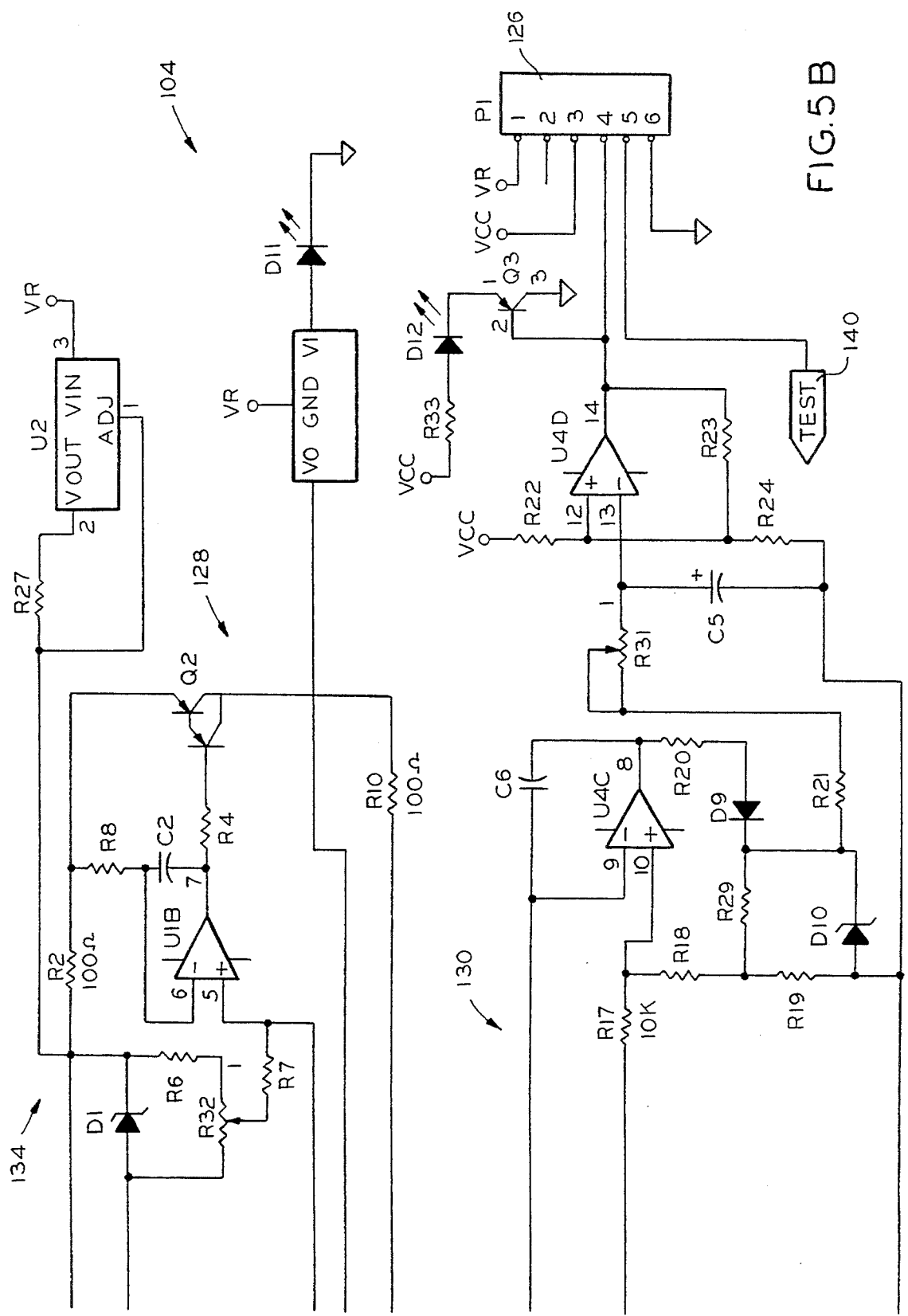

With reference to FIGS. 5A and 5B, the control circuit 104 includes a power circuit 128 and a sensing circuit 130. The power circuit 128 includes a first current source 132 for controlling current to the first RTD 56 and a second current source 134 for controlling current to the second RTD 58. The current sources 132 and 134 receive current supply from a current limiter U2, such as an LM317L circuit chip, connected to the unregulated supply VR. This limits the current to a nominal 83 milliamps, plus or minus approximately 6 milliamps.

The output of the current limiter U2 is connected to a junction between resistors R1 and R2. The resistor R1 is connected through a transistor Q1 to the first RTD 56. The resistor R2 is connected through a transistor Q2 and a resistor R10 to the second RTD 58. A precision voltage reference D1 establishes a reference voltage of 1.2 volts below the voltage at the junction of the resistors R1 and R2. This reference is used by operational amplifiers U1A and U1B to control current through the resistors R1 and R2, respectively.

The output of the op amp U1A is connected via a resistor R5 to the transistor Q1. The non-inverted input is connected via a resistor R7 to a potentiometer R32. The inverted input is connected via a capacitor C1 to the output and via a resistor R4 to the junction between the resistor R1 and the transistor Q1. The op amp U1A and its associated circuit act to hold its inputs to be identical. To do so, the op amp U1A lowers its output, thus driving Q1 harder, until enough current passes through the resistor R1 to make the inputs balance. The non-inverted input of the op amp U1A is adjusted from 1.2 volts below the reference to approximately 0.4 volts below the reference. This adjustment is provided by position of the potentiometer R32, which is selected by a user to control current through the first RTD 56 and establish the switch set point. Because the resistance of the resistor R1 is 20 ohms, the maximum current is 60 milliamps.

The second current source 134 is configured similarly to the first current source 132. Particularly, the op amp U1B includes its non-inverted input connected to the resistor R7 and its inverted input connected via a capacitor C2 to its output. The inverted input is also connected via a resistor R8 to the junction between the resistor R2 and the transistor Q2. As above, the op amp U1B controls current through the resistor R2 which is 100 ohms. This assures that the current through the first RTD 56 is always five times greater than the current through the second or "cold" RTD 58. The higher current through the first RTD 56 causes it to undergo self heating, which is used to perform measurement of thermal dispersion.

Each of the RTD's 56 and 58 are identical and provide 100 ohms at 0° C. with resistance increasing with temperature. Because the hot RTD 56 has more current than the cold RTD 58, the voltage generated across the hot RTD 56 is larger than the voltage across the cold RTD 58. The increased current through the hot RTD 56 induces self heating, which will further increase the voltage across it.

The switch 10 is configured to allow for an integrally mounted sensor, as shown, or a remotely mounted sensor. For integral mount, the jumpers J4, J5 and J6 are installed on the circuit board. With remote mounted sensors, these jumpers are cut or removed. For remote mounting the drive current is through a separate wire from the wire that senses the induced voltage. This connection, known as a "Kelvin connection", increases the accuracy of the measurement by eliminating the cable resistance from the measurement.

The sensing circuit 130 includes an op amp U4A. A non-inverted input of the op amp U4A is connected to ground return of the RTD's 56 and 58. The op amp U4A establishes a reference for the sensor based on the voltage at the ground return. In remote applications this reference is important, as it can be well above circuit ground.

An op amp U4B includes its non-inverted input connected through a resistor R12 to the cold RTD 58. The op amp U4B and related resistors, R14–R16, and potentiometer R30 provide gain to the voltage sensed across the cold RTD 58. The value of the gain is selected by a jumper J7 and adjustment of the potentiometer R30. These adjustments are made to bring the output of the op amp U4B up to the voltage level on the hot RTD 56 under no flow or dry conditions.

A comparator U4C is provided with related components to provide hysteresis. Its inverted input is connected to the hot RTD 56 via a resistor R11. Its non-inverted input is connected via a resistor R17 to the output of the op amp U4B. The comparator U4C develops a high output when the non-inverted input is greater than the inverted input. This condition occurs when the sensor is subjected to high flow conditions or to high liquid level. The particular trip point is selected by adjusting the power circuit resistance R32, as discussed above. Conversely, the output of the comparator U4C is low when the voltage at the inverted input is greater than at the non-inverted input as under low flow or low level conditions. Particularly, the self heating of the hot RTD 56 results in the voltage sensed at the hot RTD 56 being greater than the cold RTD 58. When the thermal properties of a sensed process media change the difference in RTD voltages changes. This difference is sensed by the comparator U4C. Indeed, the change in thermal properties is caused by changes in thermal conduction. For example, in a level application air provides thermal dispersion. As the probe tip assembly 50 is immersed the temperatures of the two probes 52 and 54 approach. In flow applications temperature stabilizes with no flow. As flow increases temperature stabilizes at a lower temperature.

The output of the comparator U4C is used to control relay operation with a time delay selected by a potentiometer R31. The potentiometer R31 is operatively connected between the output of the comparator U4C and the inverted input of a comparator U4D. The non-inverted input of the comparator U4D is connected to a reference formed by a voltage divider consisting of resistors R22 and R24. The output of the comparator U4D comprises the relay drive circuit at the node 114, see FIG. 4. The output of the comparator U4D is also connected to a transistor Q3 which controls operation of an LED D 12 which is energized when a trip condition occurs.

The control circuit 104 also includes a second portion 112-2 of the self test circuit. When self test is commanded, either by depressing the push button SW1 or remote switching of the switch 124, see FIG. 4, a test node 140 is grounded. The test node 140 is connected to one side of a coil 142 of a Reed relay K2 with the opposite side being connected to the unregulated supply VR. The Reed relay K2 includes a contact 144 connected in series between ground and a resistor R25 to the inverted input of the op amp U1A of the first current source 132. In this way the Reed relay K2, when commanded by self test operation, shorts the resistor R25 to ground, which decreases current through the hot RTD 56. This drop in current causes a drop in voltage across the hot RTD 56 to provide less differential between the hot RTD 56 and cold RTD 58 sensed by the sensing circuit comparator U4C to perceive it as a high flow or high level condition.

As described above, the self test circuit 112 can be used to test switch operation. This is commanded either by a remote contact closure with the remote switch 124, or by depressing the local switch SW1. As seen in FIG. 1, the local switch SW1 is mounted on the first circuit board 30. To access the switch SW1, the cover 16 must be removed. It may be desired to test circuit operation without removal of the cover 16 or ability to provide remote switching using switch 124. For these purposes, the coupler mounted Reed switch 62, see FIG. 2, is used. The Reed switch 62 is shown schematically in FIG. 5A as consisting of a relay coil 146 and contact 148. A resistor 150 may be series connected with the contact 148. The contact 148 and resistor 150 are connected in shunt with the hot RTD 56. The contact 148 is selectively closed by positioning a magnet 152, see FIG. 2, in proximity with the adaptor nut 42. As is well known, positioning a magnet in proximity to a Reed switch causes a change of state of a contact. Thus, when the magnet 152 is positioned proximate the adaptor nut 42, the contact 148 is closed so that the contact shorts out the hot RTD 56, assuming that the resistor 150 is zero resistance. The particular value of the resistor 150 can be selected to simulate select flow rates in flow switch applications. When the contact 148 is closed current through the hot RTD 56 decreases causing a corresponding voltage decrease. This change in voltage is sensed by the comparator U4C as a high flow or level condition.

Figure 6:
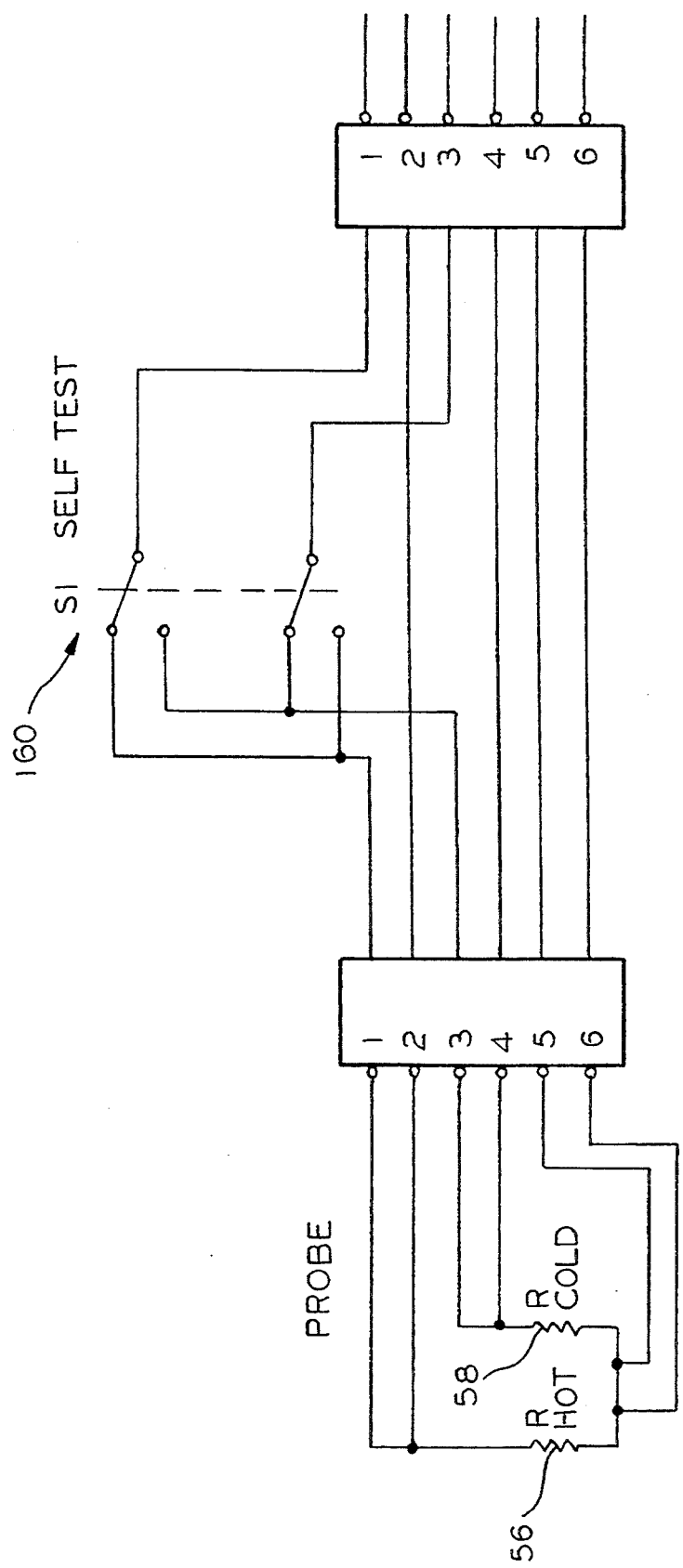
FIG. 6 comprises a partial schematic of a circuit to be used with the circuit of FIG. 5A to provide an alternative self test operation.

Additional schemes can be used to implement the self test function. For example, the Reed relay K2 can be eliminated and replaced directly with a push button contact. However, use of the Reed relay K2 provides the ability to remotely control the self test operation. Also, a self test feature could be implemented using a selector switch 160, see FIG. 6, which selectively reverses connections from the current sources 132 and 134 to the first and second RTD's 56 and 58. This change causes a decrease in current through the hot RTD 56 relative to the cold RTD 58 to simulate a high flow or level condition.

In each self test embodiment the ratio of current through the hot RTD 56 is controlled relative to the cold RTD 58 to simulate a change in thermal properties of a process media. Each type of test performed is a two-part test. The first part of the test comprises reducing current in the hot RTD 56 relative to the cold RTD 58. This tests the switch 10 to ensure that it is capable of reading a changed in sensed voltage. This aspect of the test does not test for low flow or low level, but instead tests only for high flow or level. Subsequent return to normal operation returns the circuit to low level or flow condition, assuming such a condition actually exists, as the second part of the test.

The disclosed embodiment Of the invention illustrates the broad concepts comprehended by the inventor.

I claim:

1. A thermal dispersion sensing instrument for detecting thermal properties of a process media, comprising:
a sensor including two probes each enclosing a resistance temperature device (RTD), the probes being adapted to be disposed in a process media;
a power circuit including first and second current sources each connected to one of the RTD's, the first and second current sources producing current to the RTDs at a fixed ratio to cause self heating of one of the probes relative to the other;
a sensing circuit connected to the first and the second RTDs including a comparator for comparing voltage across the first RTD and the second RTD to determine thermal properties of the process media;
a self test circuit operatively associated with the power circuit including means for selectively modifying the fixed current ratio of RTD current to simulate a change in thermal properties of the process media; and
an output circuit including means operatively driven by said comparator for indicating the determined thermal properties.

2. The thermal dispersion sensing instrument of claim 1 wherein said self test circuit comprises a switch connected in shunt with the self heated RTD and including means for selectively operating said switch to simulate a change in thermal properties of the process media.

3. The thermal dispersion sensing instrument of claim 2 wherein said switch comprises a Reed switch operated by positioning a magnet in proximity thereto.

9

4. The thermal dispersion sensing instrument of claim 1 wherein said self test circuit comprises a switch and series resistor connected in shunt with the self heated RTD and including means for selectively operating said switch to simulate a select change in thermal properties of the process media.

5. The thermal dispersion sensing instrument of claim 1 wherein said self test circuit comprises a switch connected to the current source operatively associated with the self heated RTD and including means for selectively operating said switch to produce a drop in current to the self heated RTD to cause a corresponding drop in voltage across the self heated RTD.

6. The thermal dispersion sensing instrument of claim 5 wherein said switch comprises a relay and said operating means comprises a push button.

7. The thermal dispersion sensing instrument of claim 5 wherein said switch comprises a relay and said operating means comprises a terminal connected to said relay to provide remote operation of the self test circuit.

8. The thermal dispersion sensing instrument of claim 1 wherein said output circuit includes a delay circuit to prevent operation of the indicating means a select time duration after first operation of said power circuit.

9. The thermal dispersion sensing instrument of claim 8 wherein said delay circuit includes means for selecting a relatively short select time duration and a relatively long select time duration.

10. The thermal dispersion sensing instrument of claim 1 wherein said self test circuit comprises a switch for selectively reversing connection of the RTDs to the first and second current sources.

11. A thermal dispersion switch for detecting thermal properties of a process media, comprising:

a sensor including first and second probes each enclosing a respective first and second resistance temperature device (RTD), the probes being adapted to be disposed in a process media;

a power circuit including a first current source operatively connected to the first RTD and a second current source operatively connected to the second RTD, the first and second current sources producing current at a fixed ratio to the first and second RTDs to cause self heating of the first probe relative to the second probe;

a sensing circuit connected to the first and the second RTDs including a comparator for com:paring voltage across the first RTD and the second RTD to determine thermal properties of the process media;

10 a self test circuit operatively associated with the power circuit including means for selectively modifying the fixed current ratio of RTD current to simulate a change in thermal properties of the process media; and an output circuit including a switch operatively driven by said comparator according to the determined thermal properties.

12. The thermal dispersion switch of claim 11 wherein said self test circuit comprises a switch connected in shunt with the first RTD and including means for selectively operating said switch to simulate a change in thermal properties of the process media.

13. The thermal dispersion switch of claim 12 wherein said switch comprises a Reed switch operated by positioning a magnet in proximity thereto.

14. The thermal dispersion switch of claim 11 wherein said self test circuit comprises a switch and series resistor connected in shunt with one of the RTDs and including means for selectively operating said switch to simulate a select change in thermal properties of the process media.

15. The thermal dispersion switch of claim 11 wherein said self test circuit comprises a switch connected to the first current source and including means for selectively operating said switch to produce a drop in current to the first RTD to cause a corresponding drop in voltage across the first RTD to simulate a select change in thermal properties of the process media.

16. The thermal dispersion switch of claim 15 wherein said switch comprises a relay and said operating means comprises a push button.

17. The thermal dispersion switch of claim 15 wherein said switch comprises a relay and said operating means comprises a terminal connected to said relay to provide remote operation of the self test circuit.

18. The thermal dispersion switch of claim 11 wherein said output circuit includes a delay circuit to prevent operation of the switch a select time duration after first operation of said power circuit.

19. The thermal dispersion switch of claim 18 wherein said delay circuit includes means for selecting a relatively short select time duration and a relatively long select time duration.

20. The thermal dispersion switch of claim 11 wherein said self test circuit comprises a switch for selectively switching connection of the RTDs so that said first RTD is connected to the second current source and the second RTD is connected to the first current source.

* * * * *